United States Patent [19]

Thutt et al.

[11] Patent Number: 5,448,035

[45] Date of Patent: Sep. 5, 1995

[54] METHOD AND APPARATUS FOR PULSE FUSION SURFACING

[75] Inventors: Paul Thutt, Hillsboro; Gordon A. Moyle, Portland; John E. Kelley, Gaston, all of Oreg.

[73] Assignee: Advanced Surfaces and Processes, Inc., Cornelius, Oreg.

[21] Appl. No.: 54,562

[22] Filed: Apr. 28, 1993

[51] Int. Cl.6 .............................................. B23K 9/04
[52] U.S. Cl. .................................. 219/76.13; 219/77
[58] Field of Search .............................. 219/76.13, 77

[56] References Cited

U.S. PATENT DOCUMENTS

| | | | |
|---|---|---|---|
| 3,193,926 | 7/1965 | Honiss | 30/350 |
| 3,200,234 | 8/1965 | Crawford | 219/76.13 |
| 3,274,686 | 9/1966 | Dawidowicz . | |
| 3,277,266 | 10/1966 | Blaszkowski | 219/76 |
| 3,277,267 | 10/1966 | Blaszkowski | 219/76 |
| 3,416,227 | 12/1968 | McDonald | 30/348 |
| 3,488,844 | 1/1970 | Lesh | 30/350 |
| 3,496,973 | 2/1970 | Ballard | 143/133 |
| 3,832,514 | 8/1974 | Antonov | 219/76.13 |
| 4,226,697 | 10/1980 | Antonov et al. | 219/76.13 |
| 4,405,851 | 9/1983 | Sheldon | 219/76.13 |
| 4,551,603 | 11/1985 | Rocklin | 219/76.13 |
| 4,764,654 | 8/1988 | Ady | 219/76.13 |
| 4,864,094 | 9/1989 | Saltzman et al. | 219/77 |
| 4,866,237 | 9/1989 | Inoue | 219/79.13 |

Primary Examiner—Clifford C. Shaw
Attorney, Agent, or Firm—Marger, Johnson, McCollom & Stolowitz

[57] ABSTRACT

The invention both rotates and oscillates the electrode at the same time to increase the quality of materials deposited onto a substrate during an pulse fusion surfacing process. The PFS spark rate is also varied to further increase the quality and effectiveness of the PFS process. Electrode oscillation keeps the electrode from welding to the substrate surface and electrode rotation maintains even wear on the electrode work surface. An evenly worn electrode surface allows the PFS process to generate more consistent substrate surfaces. In addition, electrode oscillation neutralizes "run away" conditions and varying spark torque that occur with electrodes that are only rotated. The spark rate is varied according to various PFS process parameters (e.g., substrate material) to further improve the quality of the PFS deposition layer. The pulse fusion surfacing process according to the invention is utilized to create knife blades that remain sharp even after extended use due to differential wear between the blade substrate material and the PFS material.

46 Claims, 6 Drawing Sheets

METHOD AND APPARATUS FOR PULSE FUSION SURFACING

BACKGROUND OF THE INVENTION

This invention relates generally to pulse fusion surfacing and more particularly to an improved method and apparatus for pulse fusion surfacing. The invention also relates to a laminated knife blade produced by use of the improved pulse fusion surfacing method and apparatus.

Pulse fusion surfacing (PFS) refers to a pulsed-arc micro-welding process that uses short-duration, high-current electrical pulses to deposit an electrode material onto a metallic substrate. PFS allows a fused, metallurgically bonded coating to be applied with a sufficiently low total heat output so that the bulk substrate material remains at or near ambient temperatures. The short duration of the electrical pulse allows an extremely rapid solidification of the deposited material and results in a fine-grained, homogeneous coating that approaches an amorphous structure. The process has been used in the past to apply wear and corrosion resistant surfaces on materials used in harsh environments. Alternative coatings have been used to alter the substrate surface resistance to wear and corrosion.

Pulse fusion surfacing is a well known technique that has been used for many years and is, therefore, not described in detail. In a PFS process both the electrode and the workpiece (i.e., substrate) are conductive and form the terminal poles of a direct current power source. When a high surge of energy is applied to the electrode, a spark is generated between the electrode and the substrate. While not known for sure, it is generally assumed that a gas bubble forms about the spark discharge from the electrode and persists for a time longer than the spark itself. Metal melted due to the high temperature of the spark is then transferred from the electrode to the substrate surface via the expanding gas bubble. Alternatively, the polarities between the electrode and the substrate can be reversed so that metal can be transferred from the substrate to the electrode.

The electrode must remain moving to fracture adhesive junctions that form between the electrode and the substrate as molten metal is deposited and solidified. To prevent inadvertent adhesion, the electrode is linearly vibrated to maintain a relative motion between the two poles. Electrode vibration is created by mounting the electrode to the armature of a solenoid. Alternative methods have also been used to maintain electrode motions. For example, U.S. Pat. No. 4,405,851 to Sheldon discusses oscillating the electrode back-and-forth in a clockwise/counter-clockwise motion. In another method of maintaining relative motion between the the electrode and the substrate, the electrode is simply rotated about it axis.

Electrode vibration or oscillation, however, are not effective in generating a high quality substrate surface. Since a relatively small area of the electrode is used during the PFS process, the vibration or oscillation "flattens" or creates facets on the electrode. The electrode facets change both the physical and electrical relationship between the electrode and the substrate. For example, a fiat electrode distributes metal onto the substrate surface differently than a round electrode. In addition, the electrical characteristics (e.g., resistance) between the two poles change proportionally to the amount of electrode surface area that contacts the substrate surface. If the electrode continues to change shape over the PFS process, the characteristics of the electrode material transferred onto the substrate surface also changes.

A consistent substrate surface is critical in PFS applications where the PFS deposition layer is used to impart predetermined frictional characteristics to the substrate. For example, if the PFS process is used to increase the surface friction of the substrate, an inconsistent PFS process can actually reduce gripping efficiency. In addition, an inconsistent substrate surface is aesthetically undesirable on certain consumer products, such as cutlery. Uneven electrode wear also reduces electrode operating life, in turn, increasing PFS processing costs.

For uniform wear, the electrode can be rotated about its axis. However, constant electrode rotation makes the electrode difficult to control. For example, constant rotation causes the electrode to "run away" or pull the electrode hand held applicator away from an PFS operator. A run away condition can change the speed at which the electrode is moved over the substrate. Moving the electrode over the substrate at different speeds create an inconsistent substrate surface. If an PFS operation loses control of the electrode applicator during a "run away" condition, electrode material can be alloyed at undesirable locations on the substrate.

Spark torque is the amount of force in which the electrode strikes the substrate surface. Spark torque from electrode rotation also creates undesirable conditions on the substrate surface. For example, when the electrode is moved over the substrate surface in the same direction as the electrode rotation, minimum spark torque is created between the electrode and the substrate. However, when the electrode is moved along the substrate surface in a direction opposite from the electrode rotational direction, maximum spark torque is created between the electrode and the substrate. Since spark torque also effects the surface characteristics of the electrode deposition material, rotating the electrode during the PFS process can actually reduce substrate surface consistency.

The individual electrical discharges through the electrode to the substrate must be of short duration or a condition known as arcing occurs. Arcing is the electrical discharge of low intensity and long duration. The duration of a spark during arcing can be up to one hundred times longer than is desirable for pulse fusion surfacing purposes. A spark of this duration alters the surface characteristics of the substrate and if allowed to continue can potentially alter the structural integrity of the substrate. Spark characteristics vary depending upon the substrate material and the various PFS circuit parameters. For example, an PFS circuit that provides a pulse of sufficiently short duration for a first substrate material, may take longer to disperse onto the substrate of a less conductive substrate material. In addition, conductivity and corresponding spark characteristics change according to where the electrode is located on the substrate surface. These varying spark characteristics further reduce the surface consistency of the electrode material deposited on the substrate.

If the speed of the electrode is varied as it moves across the substrate surface, different locations on the substrate receive proportionally different amounts of electrode material. For example, if the electrode is moved slowly across the substrate, more energy and accordingly more electrode material is dispersed to the substrate surface. Alternatively, if the electrode is moved quickly over the substrate, less energy and proportionally less electrode material is transferred to the same relative area on the substrate surface.

Because of the above mentioned PFS process variations and substrate surface inconsistencies, the pulse fusion surfacing process has had limited applications. For example, known PFS processes do not produce a sufficiently consistent surface for consumer products where esthetics are material to marketability. In addition, the PFS process has had limited success in small geometry applications where finite variances in surface characteristics are less tolerable.

Accordingly, a need remains for an improved pulse fusion surfacing method and apparatus that is more widely applicable to apply a variety of surface coatings to a variety of substrates.

SUMMARY OF THE INVENTION

The invention comprises a method and apparatus for PFS in which the electrode is both rotated and oscillated at the same time to increase the quality of materials deposited onto a substrate during an pulse fusion surfacing process. The PFS spark rate is also varied to further increase the quality and effectiveness of the PFS process. Electrode oscillation keeps the electrode from welding to the substrate surface and electrode rotation maintains even wear on the electrode work surface. An evenly worn electrode surface, as described above, allows the PFS process to generate more consistent substrate surfaces. In addition, electrode oscillation neutralizes "run away" conditions and varying spark torque that occur with electrodes that are only rotated. The spark rate is varied according to various PFS process parameters (e.g., substrate material) to further improve the quality of the PFS deposition layer.

The system comprises a trigger/discharge circuit that controls the amount of energy distributed from a power supply to the electrode. The trigger/discharge circuit supplies discrete bursts of energy to the electrode which, in turn, transfer proportional amounts of conductive material from the electrode to the substrate. The system also includes a stepper motor that rotate and oscillate the electrode at the same time.

Both the trigger/discharge circuit and the stepper motor are controlled by a microprocessor. The microprocessor generates a series of control signals that set the electrode spark rate (i.e., the rate in which energy is dispersed from the electrode to the substrate), electrode oscillation frequency, and electrode rotation direction and speed. The microprocessor allows the PFS system to vary electrode parameters according to the desired substrate characteristics. By controlling these electrode parameters (i.e., spark rate, oscillation frequency, and rotation) the PFS process can generate a higher quality substrate surface in a wider variety of applications.

A host computer is optionally coupled to the PFS system and stores PFS processing information that is translated into a set of electrode parameters. The electrode parameters are then translated by the microprocessor into signals that control the trigger/discharge circuit and the stepper motor. The stored information allow PFS results to be accurately repeated on a wide variety of substrate materials. Alternatively, a user interface can input electrode parameters directly to the microprocessor.

The trigger/discharge circuit includes a transformer that is tapped at various voltages values to supply various amounts of voltage to a set of commutation capacitors. The commutation capacitors are different sizes and accordingly store different amounts of energy from the power supply. The capacitor discharges stored energy to the electrode. A thyristor is coupled between the commutation capacitor and the electrode and determines the rate at which energy is dispersed from the commutation capacitor to the electrode. The spark rate controls how much electrode material is deposited on the substrate. Thus, the electrode spark rate is used in a novel way to improve the quality of materials deposited on the substrate.

The stepper motor is driven by a motor controller that adjusts the motor step rate and motor rotational direction according to control signals received from the microprocessor. The electrode oscillation frequency is controlled by adjusting the step rate in conjunction with the motor direction control signal. Electrode rotation speed is then controlled by varying the duty cycle of the direction control signal. The direction of electrode rotation is adjusted in one embodiment of the invention to remain in the same relative direction in relation to the electrode movement over the substrate. In another embodiment of the invention, the spark rate is changed according to the speed at which the electrode moves over the substrate surface.

The pulse fusion surfacing process described above is utilized to create a self sharpening knife blade. The knife blade remains sharp even after extended use due to differential wear between the blade substrate material and the PFS material. A protective layer of a metal such as platinum may be deposited over the wear resistant material, creating a laminated blade having a cutting edge portion comprising three layers.

Since, the relatively thin PFS material wears at a substantially slower rate than the substrate, the knife maintains a sharp beveled angle at the blade cutting edge. The cutting edge of the blade is maintained at the approximate thickness of the deposited material.

Since, an PFS process can also apply a thicker layer of material to a substrate than standard evaporation and sputtering techniques, knives having an PFS layer stay sharper longer than present knife plating techniques. The electrode material and the knife blade are actually alloyed together in the PFS process. Thus, the PFS process has improved adhesiveness over alternative plating processes further extending blade life. Since, the invention improves upon present PFS processes, knife quality is further improved by providing a more consistent knife cutting surface with an aesthetically improved outside surface.

The foregoing and other objects, features and advantages of the invention will become more readily apparent from the following detailed description of a preferred embodiment of the invention which proceeds with reference to the accompanying drawings.

DETAILED DESCRIPTION

Figure 1:
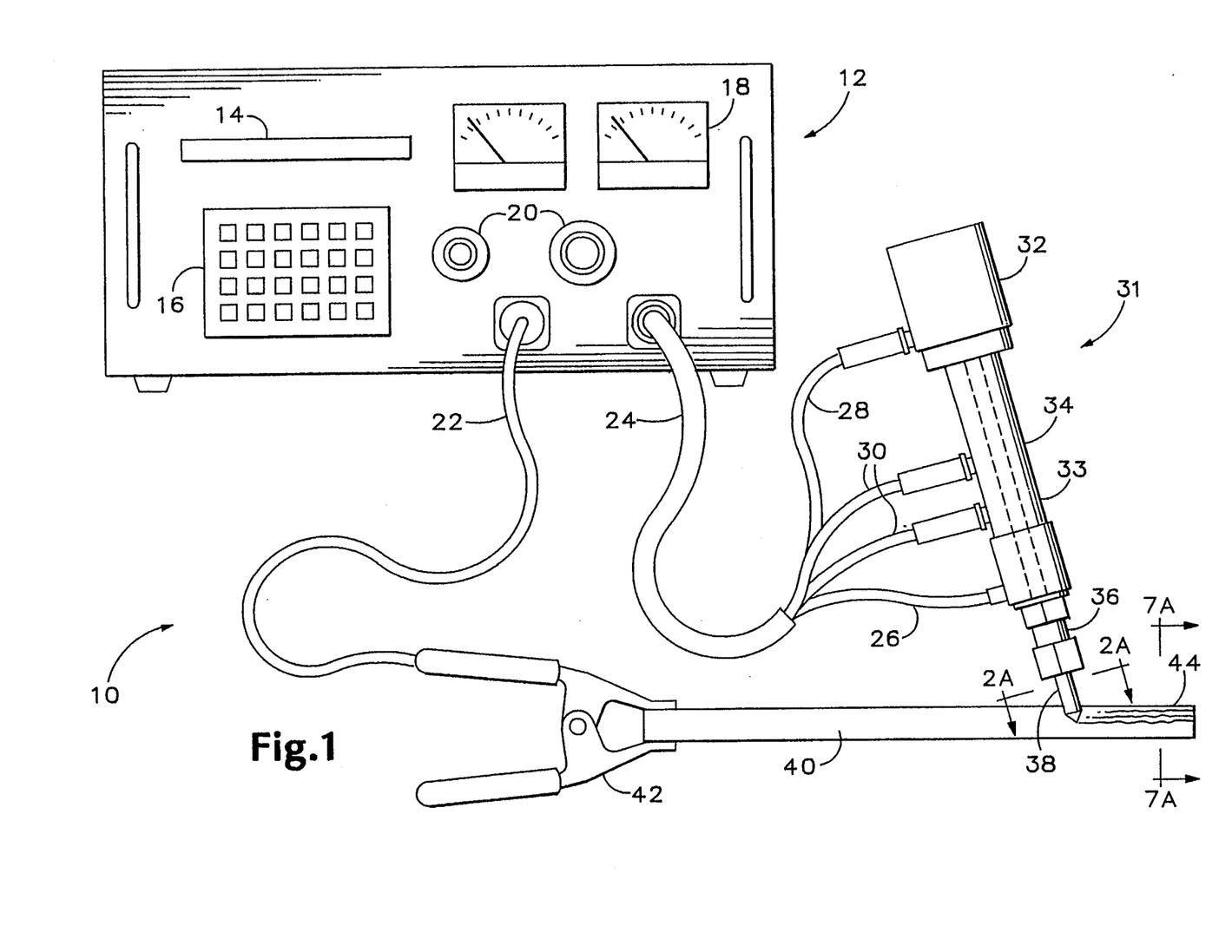
FIG. 1 is a front view of the pulse fusion surfacing system according to the invention.

FIG. 1 is a perspective view of an pulse fusion surfacing (PFS) system 10 according to the invention. The PFS system 10 comprises a control console 12 coupled through a cable 24 to an applicator 31 and coupled through a cable 22 to a polarity clamp 42. The face of the control console 12 contains an LCD display 14, user interface panel 16, voltage and current meters 18, and analog control knobs 20. The applicator 31 includes a barrel 34 coupled at the top to a stepper motor 32 and coupled at the bottom through a collet 36 to an electrode 38. The stepper motor 32 is coupled by a rotatable drive shaft 33 to the collet 36. Cable 24 contains stepper motor control lines 28 connected to stepper motor 32, power cables 30 connected through barrel 34 to electrode 38, and water cooling tubes 26. The polarity clamp 42 is attached to the front end of a knife blade 40. Depending upon the application, applicator 31 is either held in the hand of an PFS operator or machine controlled as will be shown in FIG. 3. The applicator 31 is shown applying a layer of electrode material 44 to the surface of knife blade 40 along its top edge. In the embodiment shown, the knife blade is a carbon steel, although the blade may be any alloy of steel, nickel, cobalt or titanium. The electrode material is preferably 62% WC, 25% TaC, and 13% Co binder as available from Hertel Inc.. The electrode may in other embodiments comprise any mixture of carbides, borides, or nitrides of molybdenum, niobium, titanium, zirconuium, hafnium, tungsten, tantalum or chromium with metal binders of iron, nickel, molybdenum, cobalt, aluminum, or chromium. As well, electrode compositions of platinum and platinum group metals may be used alone or in combination with the above mentioned materials to increase corrosion resistance of the knife cutting edge.

As the applicator 31 is moved horizontally along the surface of blade 40, control signals on line 28 signal stepper motor 32 to move electrode 38 in a dual rotation/oscillation motion, and individual bursts of energy are transmitted to the electrode 38 through line 30. Thus, energy is discharged from console 12 to electrode 38, and transferred in the form of a spark from the electrode 38 to knife blade 40. This spark transfers material from electrode 38 onto the surface of blade 40. The high energy spark alloys the electrode material into the substrate 40 providing a sronger bond than standard achieved with evaporation and sputtering techniques. The short duration of the spark, less than about 40 microseconds, limits the total enery delivered to the surface, and limits the temperature increase of the substrate.

Figure 2A:
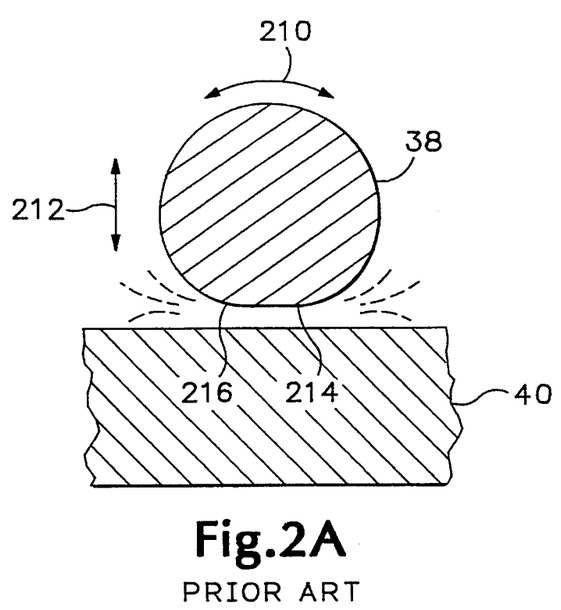
FIG. 2A is an enlarged cross-sectional view of an electrode from FIG. 1 showing a prior art method for performing an PFS process.

FIG. 2A is an enlarged cross-sectional view of electrode 38 from FIG. 1 showing a prior art method for performing the PFS process. To prevent welding, prior PFS systems either oscillate the electrode 38, as indicated by directional arrow 210 or linearly vibrate the electrode 38 as shown by directional arrow 212. As material from electrode 38 is transferred onto substrate 40, the normally round cross-sectional configuration of electrode 38 begins to flatten at the contact surface 214. The fiat surface 214 changes the surface characteristics of electrode material applied onto the substrate 40. For example, the edges 216 causes the electrode 38 to bounce, varying spark torque as energy is applied to the substrate. Varying spark torque change the amount and structural qualities of the material deposited on the substrate. In addition, changing the electrode contact surface 214 constantly varies the way in which the electrode actually "spreads" electrode material onto the substrate 40. Thus, singly rotating, vibrating, or oscillating electrode 38 creates an inconsistent, highly uncontrollable PFS process.

Figure 2B:
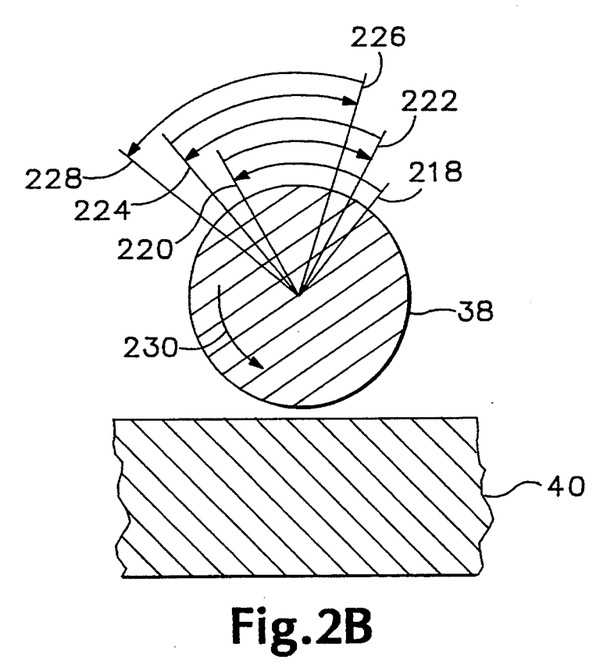
FIG. 2B is an enlarged cross sectional view of the electrode shown in FIG. 1.

FIG. 2B is an enlarged cross-sectional view of the electrode shown in FIG. 1 showing electrode motion according to the invention. The stepper motor 32 (FIG. 1) superimposes electrode rotation upon electrode oscillation to eliminate the control and surface consistency problems explained above. The electrode 38 is oscillated to prevent welding, while the superimposed rotation motion eliminates electrode flattening as shown in FIG. 2A. For example, starting from line 218, in one oscillation cycle, the electrode is rotated counter-clockwise to line 220 and then clockwise to line 222. The duty cycle (i.e., the amount of counter-clockwise rotation vs. the amount of clockwise rotation of electrode 38 for one oscillation cycle) for the counter-clockwise movement from line 218 to line 220, however, is slightly less than the clockwise portion of the vibration cycle from line 220 to line 222. In the next oscillation cycle, the electrode moves counter-clockwise from line 222 to line 224 then clockwise to line 226. Notice the electrode 38 continues to move further in a counter-clockwise direction each oscillation cycle. Thus, an overall rotational motion is superimposed on the oscillating electrode 38 as illustrated by directional arrow 230. Alternative oscillation patterns which also result in rotation of the electrode through an angle of greater than 360 degrees may be devised and employed for particular applications.

The rotation motion eliminates uneven wearing on the surface of electrode 38 and is further used to control the PFS process as will be described in further detail below. In addition, the dual oscillation/rotation motion reduces the tendency for the electrode applicator to "run" in the direction of electrode rotation. Thus, PFS processing can now be effectively performed "by hand". It is important to note that the electrode moves in complete 360 degrees rotations. A complete 360 degree rotation provides more consistent electrode wear over previous PFS systems that simply oscillate (or swing) the electrode back-and-forth up to 180 degrees in either the clockwise or counter clockwise direction.

The oscillation rate and the speed of electrode rotation can be varied by adjusting the step and direction signals sent to stepper motor 32 (FIG. 1). The desired settings are input as new parameters to the control panel 16 (FIG. 1). In the embodiment described above, the electrode is oscillated counterclockwise 18 degrees, and clockwise 19.8 at a rate of 1285 cycles per minute. The electrode is rotated by this oscillation pattern 6.5 revolutions per minute. This pattern is achieved by control of the stepper motor. Stepper motor control is known to those skilled in the art and is, therefore, not described in detail. In general, the stepper motor is controlled by first setting the stepper motor step rate. The direction of stepper motor 32 (FIG. 1) is then controlled by changing the polarity of a stepper motor direction control signal. Thus varying the duty cycle of the direction control signal determines how fast the electrode rotates in either a clockwise or counter-clockwise direction.

For slow electrode rotation, the direction control signal duty cycle is almost 50% between the clockwise and counter-clockwise direction. However, for faster rotation, the duty cycle differential between the clockwise and counter-clockwise rotation is increased. To change the overall direction of electrode rotation, for example, from a clockwise rotation to a counter-clockwise rotation, the percentage of the duty cycle for the counter-clockwise electrode direction is made larger than the clockwise direction. Thus, stepper motor 32 controls electrode oscillation frequency, rotation speed, and rotation direction.

Figure 3:
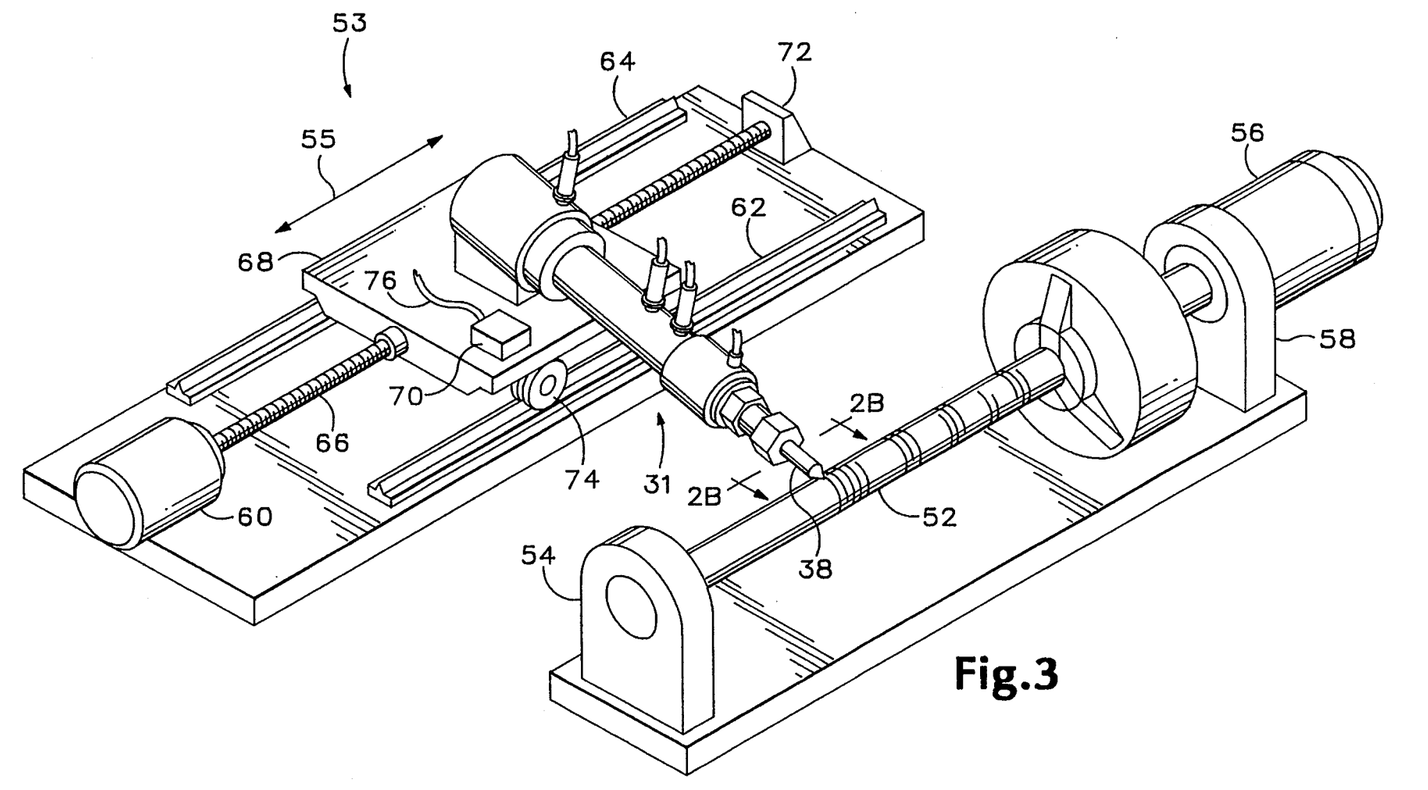
FIG. 3 is a perspective view of the electrode applicator shown in FIG. 1 coupled to a conveyer.

It was previously mentioned that the applicator may be machine controlled. FIG. 3 is a perspective view of the applicator 31 shown in FIG. 1 coupled to a conveyer 53. The conveyer 53 includes a platform 68 coupled at a first side to a rail 64 and coupled at a second side by a set of wheels 74 to a rail 62. A screw rod 66 is coupled underneath the platform 68 and is driven by a motor 60. A speed and directional sensor 70 is electronically coupled to one of the wheels 74. A cable 76 transfers information from sensor 70 to console 12 (FIG. 1). Electrode 38 from applicator 31 is moved horizontally over a substrate 52. The substrate 52 is pivotally coupled at the front end to a support plate 54 and is coupled at the back end through support plate 58 to a motor 56.

The conveyer platform 68 moves the applicator 31 in a forward or backward direction over the surface of the substrate 52. At the same time conveyor 53 is moving the applicator 31 over the substrate, motor 56 rotates substrate 52. Thus, electrode 38 comes in contact with the entire cylindrical surface area of substrate 52. The speed and direction in which platform 68 moves along the conveyer is measured by sensor 70 and relayed to console 12 (FIG. 1). As will be explained in detail below, the electrode spark rate, oscillation rate, and rotation direction and speed are adjusted according to the speed and direction of electrode 38. In addition, the electrode parameters are adjusted according to the substrate material 52 and the desired surface characteristics of the electrode deposition layer.

Figure 4:
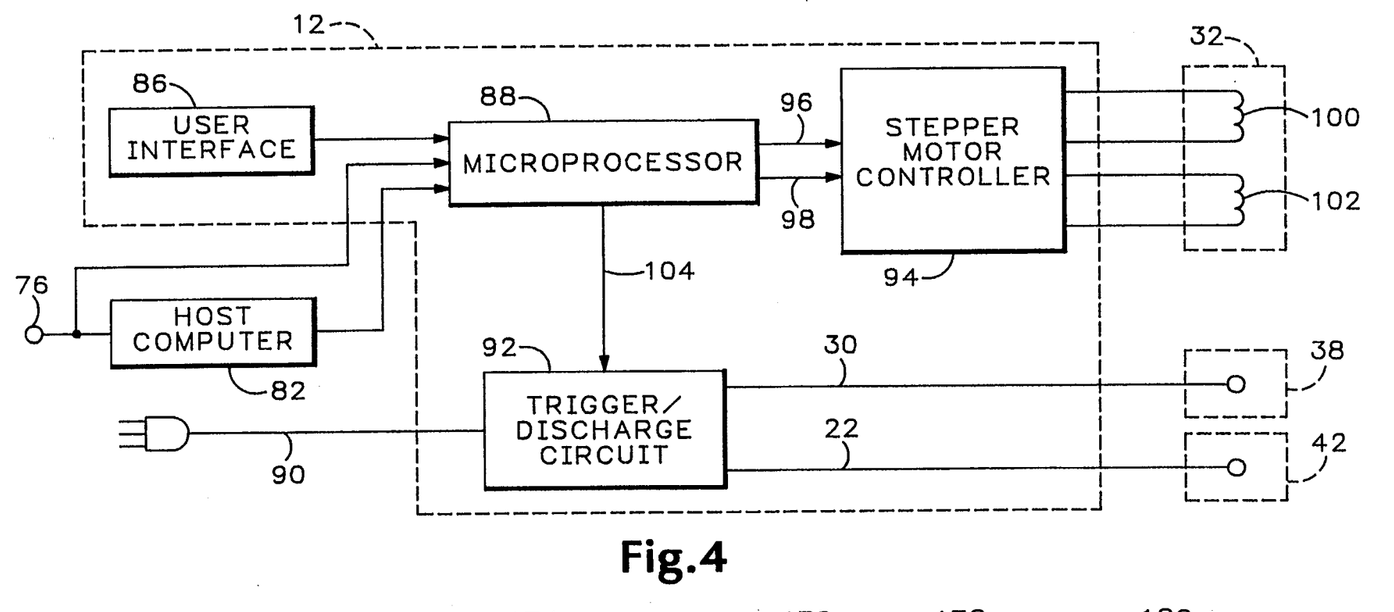
FIG. 4 is a block diagram of the PFS system shown in FIG. 1 according to the invention.

FIG. 4 is a block diagram of the electrical components of the PFS system shown in FIG. 1. The components of the console 12 (FIG. 1) include a user interface 86, a microprocessor 88, a stepper motor controller 94, and a trigger/discharge circuit 92. The microprocessor 88 receives input data from the user interface 86 and the host computer 82. The host computer 82 can receive information from an operator via a keyboard or receive data over control line 76. The microprocessor 88 sends stepper motor step control data over line 96 and stepper motor direction control data over line 98 to the stepper motor controller 94. The stepper motor controller translates the microprocessor control signals and energizes the stepper motor coils 100 and 102 in stepper motor 32 (FIG. 1). A trigger/discharge circuit 92 receives a spark activation signal over line 104 and receives electrical power over line 90. The trigger/discharge circuit is coupled to the electrode 38 by line 30 and is coupled to the polarity clamp 42 over line 22 as previously shown in FIG. 1.

User Interface 86 (i.e., control panel 16 and display panel 14 in FIG. 1) transfer information with the microprocessor 88. An PFS operator inputs specific information through user interface 86 to control electrode motion and electrode spark parameters. Alternatively, data can be transferred to microprocessor 88 from host computer 82. Microprocessor 88 is a Motorola 68HC 11. The stepper motor controller 94 is an Easy Power 49211 Model No. GS-D200 manufactured by SGS Thompson. Host computer 82 supplies data to microprocessor 88 according to type of substrate material receiving the PFS process, electrode material, desired substrate surface characteristics, or any parameter that may effect the subsequent PFS process. PFS process data is feedback over line 76 into host computer 82 or alternatively directly into microprocessor 88. The PFS process data allow the control system shown in FIG. 4 to adjust spark and electrode motion "real time" during the PFS process as will be discussed in detail below.

Microprocessor 88 receives the data from user interface 86, host computer 82, and feedback line 76 and accordingly vary the stepper motor parameters on lines 96 and 98 and the trigger discharge signal on line 104. The stepper motor controller 94 adjusts the oscillation frequency, rotation direction, and rotation speed of electrode 38. The trigger/discharge circuit 92 adjusts the duration and rate of the spark that is transferred from electrode 38 to the substrate.

Appendix 1 includes control sequence flow sheets and program listings written in Forth for the host computer and processors.

As previously discussed, the dual oscillation/rotation motion of electrode 38 is achieved by superimposing a continuous 360 rotation upon an electrode oscillation motion. This is preformed by first setting a stepper motor step rate on line 96. Stepper motor direction is then controlled by changing the polarity of the direction control signal on line 98. For example, when the direction control pulse goes high, the electrode rotates clockwise and when the direction control pulse is driven low, the electrode rotates counter-clockwise. Thus, varying the duty cycle of the direction control signal controls how fast the electrode rotates. To rotate the electrode at a very slow speed, the direction control signal on line 98 has approximately a 50% duty cycle. However, for faster electrode rotation, the duty cycle ratio on line 98 is increased. Thus, the step control signal on line 96 determines the electrode oscillation frequency and the direction control signal on line 98 determines at what ratio the electrode 38 moves in both the clock-wise and counter-clockwise directions during each oscillation cycle.

Figure 5:
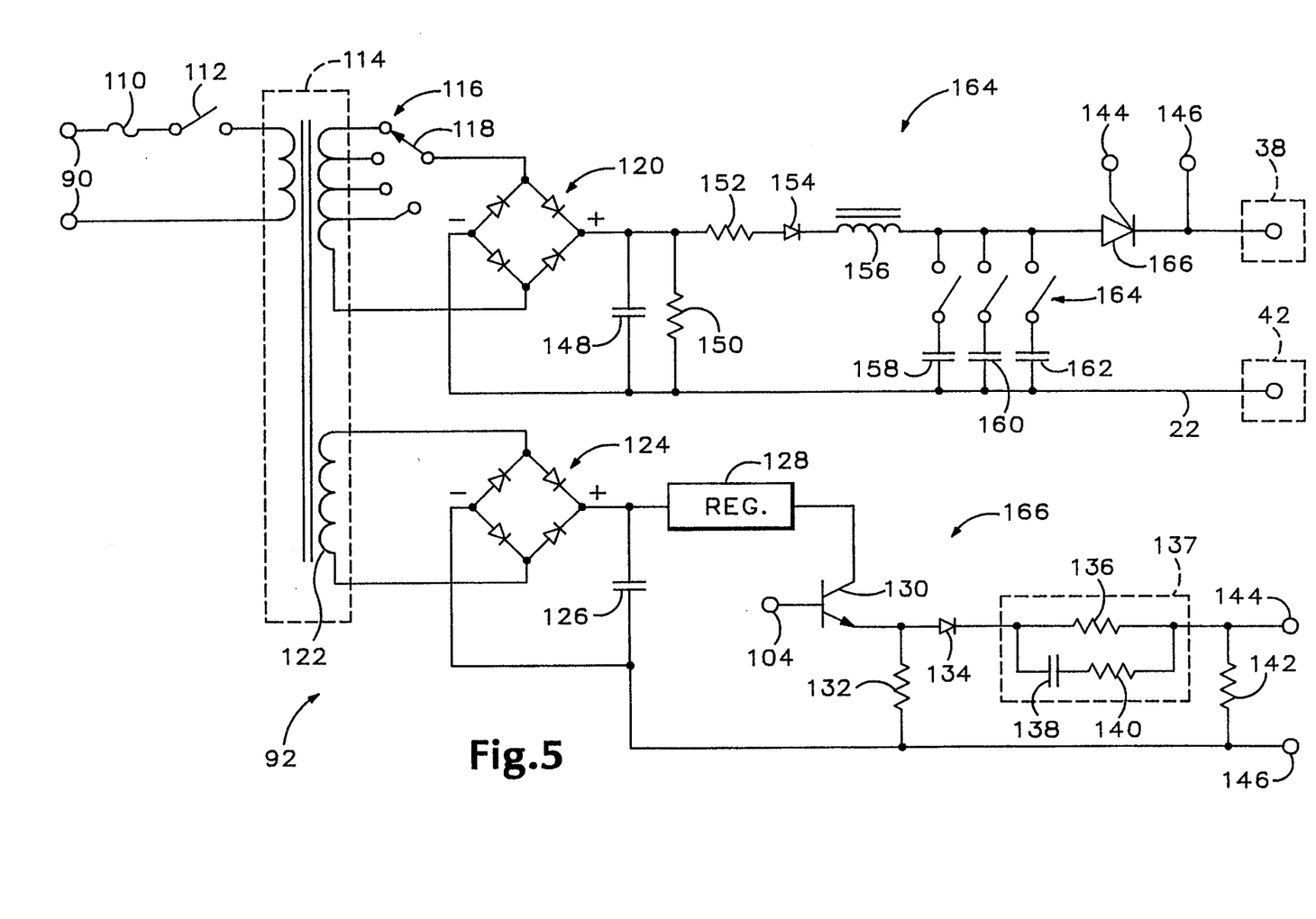
FIG. 5 is a circuit diagram of the PFS trigger/discharge circuit shown in FIG. 4.

FIG. 5 is a circuit diagram of the PFS trigger/discharge circuit 92 shown in FIG. 4. An external power supply (not shown) is fed over conductors 90 to a transformer 114. The transformer 114 has a first secondary winding 116 that feeds a discharge circuit 164 and a second secondary winding 122 that feeds a trigger circuit 166. The output power from winding 116 is converted into a DC signal by full-wave rectifier circuit 120. A storage capacitor 148 and a bleeder resistor are coupled across the output of rectifier circuit 120. Current limiting resistor 152, diode 154, and inductor 156 are connected in series and control current to a bank of commutation capacitors 158, 160, and 162. Each commutation capacitor is coupled to the DC power supply by a relay switch 164. A thyristor 166 is coupled between the commutation capacitors and the electrode 38. The negative pole of discharge circuit 164 is coupled to polarity clamp 42.

Trigger circuit 166 includes a full-wave bridge rectifier circuit 124 that generates a DC power supply across a power supply capacitor 126. The DC power supply voltage is stabilized by a voltage regulator 128 and is coupled to the remaining components of the trigger circuit by a transistor 130. The transistor 130 is enabled by a spark control signal sent from microprocessor 88 (FIG. 4) over line 104. Transistor 130 couples the DC power supply output from rectifier circuit 124 through a diode 134 and a RC circuit 137 to the gate 144 of thyristor 166. The negative terminal 146 of trigger circuit 166 is coupled to the cathode of thyristor 166.

Transformer 114 receives 120 VAC power on the primary winding and steps down the voltage at the secondary windings 116 and 122. Secondary winding 116 is tapped at various locations by a multi-position switch 118 to adjust the voltage level supplied to the discharge circuit 164. In a preferred embodiment, there are four taps in secondary winding 116 generating output voltages of 40, 50, 60, and 70 volts. The different transformer output voltages are selected according to the amount and rate at which energy is transferred to capacitor 148. Bleeder resistor 150 prevents capacitor charging while the trigger/discharge system is deactivated. Resistor 152 limits the amount of current passing from capacitor 148 to the bank of commutation capacitors.

Diode 154 and inductor 156 temporarily delay the transfer of energy from capacitor 148 to the commutation capacitors after thyristor 166 is activated. Inductor 156 delays current flow so that the commutation capacitors are not charged from capacitor 148 until first completely discharging previously stored energy through the electrode 38. Thus, the inductor 156 allows thyristor 166 to completely shut-off after the commutation capacitor has been discharged. This prevents a continuous energy path from the power supply flow to electrode 38, thereby, eliminating welding between the electrode and substrate.

The value of commutation capacitors 158, 160, and 162 are selected according to the desired electrode spark width. The spark width controls the amount of energy transferred between the electrode and the substrate for each spark cycle. The spark width and accordingly the commutation capacitor value is selected according to electrode material, substrate material, and desired characteristics of the electrode material deposited on the substrate. For example, a smooth substrate surface may require less energy per spark cycle, therefore, a smaller capacitor is selected. However, to increase substrate wear resistance a heaver layer of electrode material may required. Thus, a longer spark width (i.e., higher energy transfer) must be dispersed each spark cycle. More energy is dispersed for each spark cycle by selecting a larger commutation capacitor value. In one embodiment of the invention commutation capacitors 158, 160, and 162 are 10, 20, and 50 micro farads, respectively. The appropriate capacitor size is selected by closing the appropriate relay switch 164. Any relay switch is closed by microprocessor 88 (FIG. 3) by sending an activation signal over line 104. For clarity the control signal 104 is not shown coupled to each relay switch 164.

Trigger circuit 166 generates pulses to the gate 144 of thyristor 166 according to a spark rate control signal sent from microprocessor 88 to the gate of transistor 130. Transistor 130 when activated by the signal on line 104, supplies DC power from the rectifier circuit 124 through diode 134 to RC circuit 137. RC circuit 137 generates a pulse to the gate 144 of thyristor 166. The pulse amplitude is initially high and then ramps down until transistor 130 is eventually disabled by the spark rate signal from microprocessor 88. When transistor 130 is disabled, the signal on the gate 144 is removed disabling thyristor 166. The high amplitude pulse quickly enables thyristor 166 so that energy can quickly pass from one of the charged commutation capacitors to the electrode 38.

The trigger/discharge circuit 92 operates in the following manner. One of the commutation capacitors is enabled, for example, capacitor 158 by microprocessor 88. Polarity clamp 42 is attached to the substrate material (FIG. 1). Capacitor 158 is initially de-energized and thyristor 166 is initially disabled. Switch 112 is then shut and energy from transformer 114 is stored in capacitor 148. Energy from capacitor 148 is then transferred into capacitor 158. Thyristor 166 is then enabled and energy stored in capacitor 158 is fed to electrode 38. The signal on the gate 144 of thyristor 166 is disabled after initiating the discharge of capacitor 158. The quick discharge of energy from capacitor 158 to electrode 38 creates a spark between the electrode and the substrate that causes material from electrode 38 to deposit onto the substrate. After capacitor 158 has completed discharged, thyristor 166 shuts off allowing energy from capacitor 148 to recharge capacitor 158 for the next spark cycle.

Trigger circuit 166 controls the rate at which energy is discharged from the commutation capacitors to the electrode 38 (i.e., spark rate) further increasing controllability of the PFS process. The rate at which thyristor 166 is enabled varies according to the control signal sent from microprocessor 88 (FIG. 1) to the gate of transistor 130. The spark rate controls the characteristics of the electrode material alloyed with the substrate surface. Thus, the spark rate is controlled by microprocessor 88 to create specific characteristics on the substrate surface and to improve the consistency of the PFS process. For example, the sensor 70 from FIG. 3 transmits the speed of the applicator 31 as it moves across the surface or substrate 52. The spark rate is then adjusted so that a consistent amount of electrode material is deposited on the substrate 52.

To explain further, and referring to FIG. 3, the electrode 38 moves slower across substrate 52 as the platform 68 initially begins to move at the beginning of the PFS process. The electrode also moves slower at the end of the PFS process as the platform 68 begins to stop. A slower spark rate is, therefore, used at the beginning and at the end of the PFS process to maintain a consistent deposition layer on substrate 52. Thus, deposition layer inconsistencies from inconsistent electrode speed over the substrate surface are eliminated.

In addition, the electrode rotational direction is controlled to further improve the quality of the deposited layer. For example, some PFS applications require the electrode 38 to pass back and fourth several times over the substrate (see directional arrow 55 in FIG. 3). If the electrode maintains the same rotational direction, different deposition characteristics can occur depending which direction the electrode 38 moves across the substrate surface. When the electrode is moved over the substrate 52 in the same direction in which the electrode is rotating, for example toward motor 60, there is less spark torque between the electrode 38 and the substrate 52. However, when the electrode is moved over the substrate in a direction opposite to the electrode rotation direction, for example, away from motor 60, there is more spark torque between the electrode and the substrate. Varying spark torque alters the surface characteristics of the electrode deposition layer.

Therefore, the electrode rotation may be reversed (see FIG. 2B) to maintain a constant rotation orientation when direction of travel of the the electrode is reversed. For example, in FIG. 3, sensor 70 transmits the direction of conveyer platform 68 to microprocessor 88 (FIG. 4). The microprocessor 88 then adjusts the polarity of the direction control signal on line 89 (FIG. 4) according to the traveling direction the electrode. Thus, if platform 68 is moving toward motor 60 and electrode 38 is rotating in a clockwise direction, electrode 38 is changed to a counter-clockwise rotation when platform 68 begins moving away from motor 60. In this way, the electrode rotation direction remains constant relative to one another, maintaining constant spark torque, improving the surface consistency of the deposited material.

Figure 6:
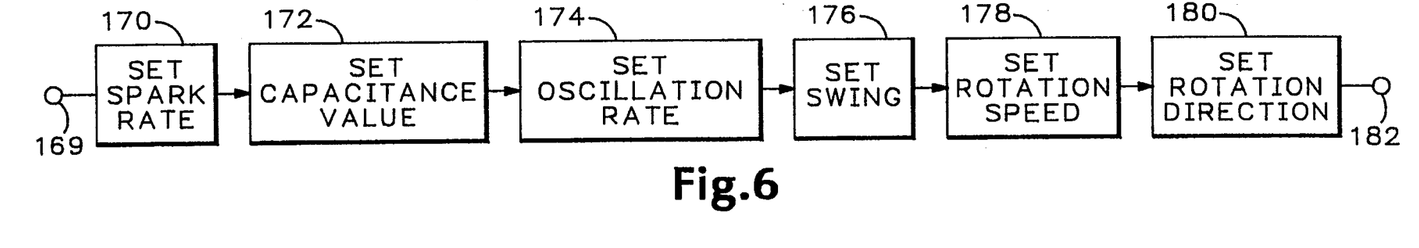
FIG. 6 is a flow chart showing the operations performed by the microprocessor shown in FIG. 4.

FIG. 6 is a flow chart showing some of the operations performed by microprocessor 88 (FIG. 4). Input data either from user interface 86, host computer 82, or the PFS process (i.e., electrode speed, direction, etc.) are received by the microprocessor 88 at input terminal 169. Block 170 then adjusts the spark rate according to the input parameters. The commutation capacitor value (FIG. 5) is then set in block 172. The electrode oscillation rate is set in block 174 and the amount of electrode swing set in Block 176. The oscillation rate controls how fast the electrode swings back-and-forth during the PFS process and the electrode swing determines how much the electrode moves in both a clockwise and counter-clockwise direction during each oscillation cycle. Block 178 sets the electrode rotation speed and block 180 controls the electrode rotation direction. As explained above, the electrode rotation direction can be altered relative to the direction that the electrode travels over the substrate. The values set in the microprocessor 88 are output on terminal 182 to either relay switches 164 (FIG. 5), stepper motor controller 94 (FIG. 4), or trigger/discharge circuit 92 (FIG. 5). Detailed machine code for microprocessor 88 that preformed the functions described in FIG. 6 are attached in appendix A and are hereby incorporated by reference.

Figure 7A:
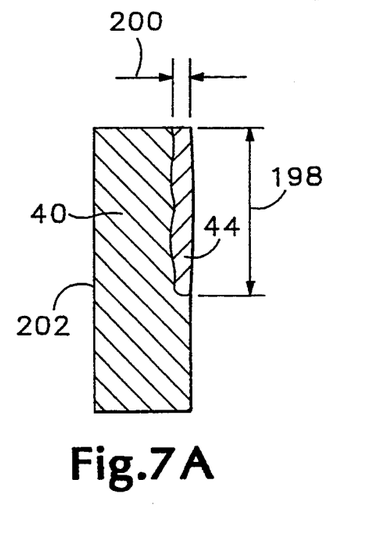
FIG. 7A is an enlarged side sectional view of the knife blade shown in FIG. 1.
Figure 7B:
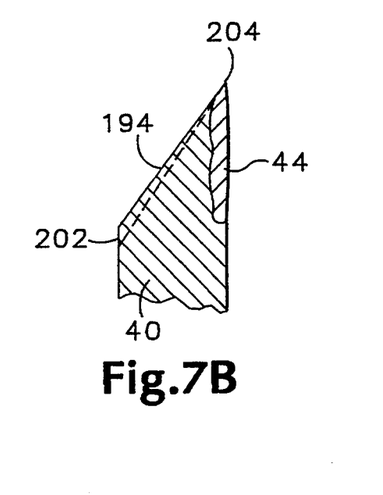
FIG. 7B is an enlarged side sectional view of the knife blade shown in FIG. 1 after beveling.

FIG. 7A is an enlarged side sectional view of the knife blade 40 shown in FIG. 1. A carbide electrode 38 (FIG. 1) is used to alloy the electrode material 44 to the front side of blade 40. In one embodiment of the invention the carbide material 44 comprises 62% tungsten carbide, 25% tantalum carbide, and 13% cobalt and is available through Hertel, Inc.. The PFS process creates a single carbide layer between 1/16"-⅛ long (dimension 198) and between 10-25 microns thick (dimension 200). Referring to FIG. 7B, after completion of the PFS process, a bevel 194 is made into the back side 202 of blade 40. The bevel comes into the back side of carbide layer 44 and typically has an angle of between 15 and 25 degrees. The bevel creates a sharp cutting edge 204. If the knife is serrated, then a serration is ground in at appropriate locations along the knife cutting edge 204.

The knife blade 40 is made of a softer material than carbide layer 44. Therefore, with extended use, blade 40 wears away faster than carbide layer 44 preferentially keeping a sharp beveled angel on the knife cutting edge 204. Dashed line 202 shows a typical bevel edge after extended cutting with knife blade 40. Thus, with extended cutting, the knife blade 40 is self sharpening by maintaining a sharp cutting edge 204. The carbide material 44 is applied to the knife blade in a thicker layer than standard evaporation and sputtering plating techniques. A thicker carbide layer is more resilient to wearing and, therefore, extends knife life. In addition, the PFS process alloys the carbide to blade 40 improving adhesiveness over evaporation and sputtering techniques. The increased PFS process control according to the invention further improves knife quality and operating life over standard PFS processes by providing a more consistent knife cutting surface with an improved outward appearance. The carbide layer can also be applied to alternative sides of the knife depending on the specific type of cutting operation, for example, chopping, slicing, or dicing.

Figure 7C:
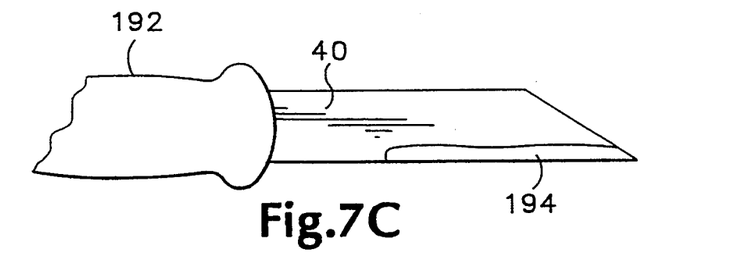
FIG. 7C is a back view of the knife blade shown in FIG. 1 after beveling.
Figure 8A:
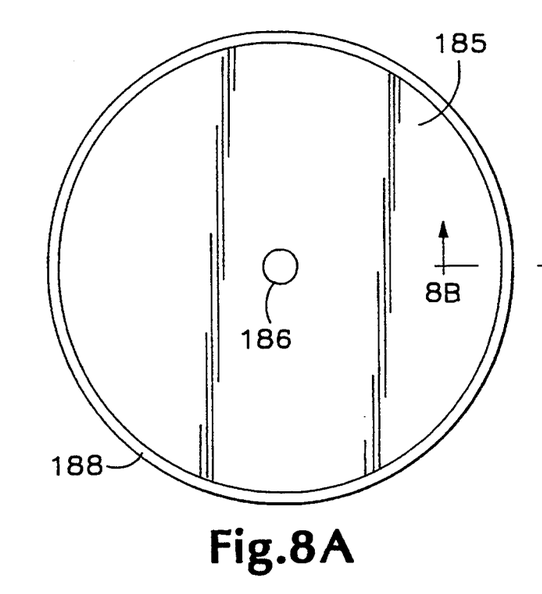
FIG. 8A is a top view of a circular knife blade.
Figure 8B:
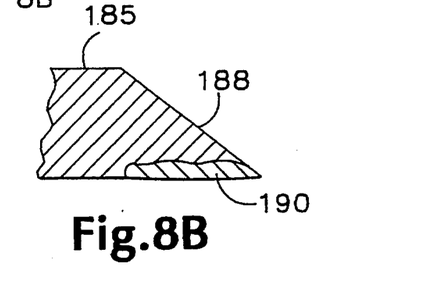
FIG. 8B is a front sectional view of the knife blade shown in FIG. 8A.

FIG. 7C is a front view of the knife blade 40 shown in FIG. 1 after the PFS and beveling process. The bevel 194 is shown on the front side of blade 40. The knife blade can be of various designs, circular, rectangular, serrated, single beveled side, or dual beveled sides, for example. For example, FIG. 8A shows a top view of a circular knife blade 185 with an electrode material applied to the bottom surface. The circular knife blade 185 has a hole 186 in the center for receiving a rotating rod and is beveled around the outer edge 188. FIG. 8B is a cross section of the beveled edge 188 of blade 185. A layer 190 is deposited to the bottom edge of blade 185 using the PFS process according to the invention as described above. As described above, blade 185 is self sharpening due to the differential wearing between layer 190 and substrate material 185.

Having described and illustrated the principles of the invention in a preferred embodiment thereof, it will be apparent that the invention can be modified in arrangement and detail without departing from such principles. I claim all modifications and variation coming within the spirit and scope of the following claims.

I claim:

1. A system for electrically fusing a conductive material into a substrate, comprising:

an electrode extending longitudinally about a central axis and comprising a conductive material;

a current source connected to the electrode including a trigger/discharge circuit for discharging a series of short-duration electrical pulses to the electrode for melting and fusing a quantity of electrode material into the substrate;

a reversible stepper motor drivably connected to the electrode, the stepper motor oscillating the electrode radially back and forth in a semi-circular path about the central axis while at the same time rotating the electrode about the same central axis thereby super-imposing a rotation into the semi-circular oscillatory movement of the electrode; and a processor coupled to the current source and to the stepper motor, the processor for controlling the discharge of the series of short-duration electrical pulses from the trigger/discharge circuit to the electrode, and for controlling the stepper motor to oscillate and rotate the electrode in a predetermined pattern and at a predetermined rate.

2. The system according to claim 1 further comprising a host computer coupled to the processor for receiving and storing parametric information relating to various substrate materials and surface characteristics and for transmitting the parametric information to the processor.

3. The system according to claim 1 including a user interface coupled to the processor for inputting parametric information into the processor.

4. The system according to claim 1 wherein the current source comprises:
an output line;
a voltage transformer having a plurality of selectable output voltages;
a plurality of storage capacitors coupled between the voltage transformer and the output line for receiving and storing energy from the voltage transformer, and for discharging short-duration electrical pulses through the output line to the electrode;
an output line switch coupled between the output line and the electrode for controlling the discharge of the short-duration electrical pulses from the power supply to the electrode; and
a trigger circuit coupled between the processor and the output line switch for controlling the timing and the rate of the short-duration electrical pulses discharged from the output line to the electrode.

5. The system according to claim 4 including a set of second switches, each second switch connected to one said storage capacitor and to the output line, each second switch operable to electrically connect the capacitor to the output line responsive to a signal from the processor.

6. The system according to claim 1 wherein the stepper motor includes a motor controller for receiving stepper motor control signals from the processor.

7. The system according to claim 1 wherein the processor is programmable to transmit a predetermined control signal sequence for melting and fusing a predetermined quantity of conductive material into the substrate as a layer, the fused conductive material layer having a preselected surface morphology.

8. The system according to claim 1 including a conveyer for moving the electrode on the substrate in a predetermined pattern.

9. The system according to claim 8 including means for transmitting conveyer direction information to the processor for adjusting the direction of electrode rotation responsive thereto.

10. The system according to claim 8 including means for transmitting conveyer speed to the processor for controlling the rate at which current pulses are discharged from current source to the electrode.

11. A system for transferring metallic conductive materials between an electrode and a substrate, the rate at which material is transferred between the electrode and the substrate varying according to as set of system parameters and a set of substrate parameters, the system comprising:
a power supply for supplying energy to the electrode;
a bank of variable sized capacitors coupled to the power supply, each capacitor storing a different amount of energy from the power supply;
a switch coupled between the capacitors and the electrode for initiating the discharge of energy from the capacitors to the electrode; and
a control circuit coupled to the switch for automatically varying the rate at which energy is discharged from the capacitors into the electrode according to the speed at which the electrode is moved over the substrate.

12. The system according to claim 11 including an inductor coupled between the power supply and the capacitor bank for regulating output energy from the power supply to the capacitor bank.

13. The system according to claim 11 including a diode coupled between the power supply and the capacitor bank for directing energy discharged by the capacitor bank into the electrode.

14. The system according to claim 11 wherein the power supply includes an adjustable output transformer for controlling the power supply output voltage.

15. The system according to claim 11 wherein each capacitor in the capacitor bank is coupled in series with an associated switch, each switch being operable to electrically connect its respective capacitor to the power supply and the electrode.

16. The system according to claim 11 wherein the switch consists of a silicon controlled rectifier having a gate, an anode, and a cathode, the gate coupled to the control circuit, the anode coupled to the power supply and the cathode coupled to both the control circuit and the electrode.

17. The system according to claim 11 wherein the control circuit comprises:
an adjustable activation circuit;
a gate coupled at a first end to the power supply and the output from the activation circuit; and
a delay network coupled between a second end of the gate and the switch.

18. A method for melting and fusing a conductive material into a substrate, comprising:
providing an electrode formed of a conductive material;
discharging a series of discrete short-duration current pulses through the electrode to the substrate for melting and fusing a predetermined amount of the conductive material into the substrate;
oscillating the electrode radially back and forth at a predetermined rate and in a predetermined semicircular pattern about an electrode longitudinal axis;
rotating the electrode about the same longitudinal axis super-imposing an electrode rotation into the radial oscillatory movement of the electrode; and
controlling the rate of current pulses to the electrode, the oscillation frequency of the electrode, and the rotational speed of the electrode to form a layer of conductive material having a predetermined surface morphology.

19. The method according to claim 18 which further includes the step of controlling the energy of the current pulses to provide a predetermined conductive material surface morphology.

20. The method according to claim 18 including controlling the direction of electrode rotation responsive to the direction the electrode is moved over the substrate.

21. The method according to claim 18 including varying the rate of current pulses responsive to changes in the speed at which the electrode is moved over the substrate.

22. The method according to claim 18 comprising the step of reversing the polarity between the electrode and the substrate to transfer conductive material from the substrate to the electrode.

23. The method according to claim 18 including storing the energy dispersion rate, and electrode rotational and oscillation rates for various types of substrate materials and repeating various dispersion, rotation, and oscillation rates according to type of substrate material and surface characteristics.

24. The method according to claim 18 wherein the electrode is continuously rotated through an arc greater that 360 degrees.

25. A method of forming a self-sharpening cutting blade, comprising the steps of:
providing a metallic substrate having a first and second side joined together at a top end by a top face;
depositing a thin layer of wear-resistant material from an electrode onto the substrate only on the first side and a first portion of the top face of the substrate while the second side and a second portion of the top face remain uncovered by the wear-resistent material, the wear-resistant material being substantially harder than the substrate; and
beveling the blade from the first side of the substrate down toward the second side of the substrate forming a cutting edge between the wear-resistant material on the first side of the substrate and the top face of the substrate formed of two materials of different wear resistances; and
cutting with the cutting edge so that the second portion of the top face wears at a faster rate than the first portion of the top face thereby increasing the sharpness of the cutting edge formed between the first side and top face of the substrate.

26. The method according to claim 25 wherein the step of forming the wear-resistant layer comprises depositing a layer of wear-resistant material by a pulsed fusion deposition process comprising the steps of:
providing an electrode comprising the wear-resistant material extending about a longitudinal axis;
connecting the electrode to an electrical current source;
positioning the electrode adjacent the first side of the blade adjacent the edge;
oscillating the electrode back and forth in a semi-circle about the longitudinal axis at a predetermined rate and in a predetermined pattern;
rotating the electrode completely about the longitudinal axis at the same time that the electrode is oscillating superimposing a 360 degree rotation into the predetermined semi-circular pattern; and
discharging a series of short-duration electrical current pulses from the current source through the electrode to the substrate, thereby melting and fusing a thin layer of the wear-resistant material into the substrate.

27. The method of claim 26 which further comprises the step of controlling the electrical current pulses, the oscillation frequency and the rotational direction and speed of the electrode to achieve a predetermined surface morphology in the wear-resistant material layer.

28. The method of claim 25 wherein the step of beveling the blade includes forming serrations in the blade edge.

29. The method of claim 25 wherein the blade is beveled on a second side opposite the wear-resistant layer.

30. The method of claim 25 which further comprises forming a corrosion resistant layer atop the wear resistant layer.

31. The method of claim 25 wherein the corrosion resistant layer comprises a material selected from the group consisting of the platinum group metals.

32. The method of claim 25 wherein the width of the wear-resistant layer is between 1/16 and ½ inches inclusive.

33. The method of claim 25 wherein the thickness of the wear-resistant layer is between 10–25 microns inclusive.

34. The method of claim 25 wherein the step of beveling the edge includes beveling the edge to an angle between 15–25 degrees inclusive.

35. The method of claim 25 wherein the wear-resistant material is selected from the group consisting of carbides, nitrides and borides.

36. The method of claim 25 wherein the wear-resistant material comprises tungsten carbide, tantalum carbide and cobalt.

37. The method of claim 25 wherein the wear-resistant material comprises about 62 wt % tungsten carbide, about 25 wt % tantalum carbide and about 13 wt % cobalt.

38. The method of claim 25 wherein the substrate is formed from a material selected from the group consisting of steel, nickel, cobalt and titanium.

39. A self-sharpening knife, comprising:
a metallic substrate having a first side and a second side joined together by a top face;
a thin layer of wear-resistant material pulse fused only to the first side of the substrate and on an adjacent portion of the top face, the wear-resistant layer having a width, a length, and a thickness, the wear-resistant material being harder than the substrate;
the substrate being beveled along the top face from a top end of the first side down to the second side forming a sharpened cutting edge between the first side and the top face of the substrate, the top face forming a composite including the wear-resistant material in the adjacent portion adjacent to the first side of the substrate and the substrate located between the adjacent portion of the top face and the second side of the substrate; and
the metallic substrate of the cutting edge wearing at a faster rate than the wear-resistant material thereby maintaining a sharpened cutting edge as the knife is used.

40. A knife according to claim 39 wherein the width of the wear-resistant layer is between 1/16 and ½ inches.

41. A knife according to claim 39 wherein the thickness of the wear-resistant layer is between 10–25 microns.

42. A knife according to claim 39 wherein the edge is beveled at an angle between 15–25 degrees.

43. A knife according to claim 39 wherein the wear-resistant material is selected from the group consisting of carbides, nitrides and borides.

44. A knife according to claim 39 wherein the wear-resistant material comprises tungsten carbide, tantalum carbide and cobalt.

45. A knife according to claim 39 wherein the wear-resistant material comprises about 62 wt % tungsten carbide, about 25 wt % tantalum carbide and about 13 wt % cobalt.

46. A knife according to claim 39 wherein the substrate is formed from a material selected from the group consisting of steel, nickel, cobalt and titanium.

* * * * *